United States Patent [19]
Jones et al.

[11] Patent Number: 5,953,091
[45] Date of Patent: Sep. 14, 1999

[54] MULTI-DOMAIN LCD AND METHOD OF MAKING SAME

[75] Inventors: Michael R. Jones, South Lyon; Laurie D. Lovshe, Canton, both of Mich.

[73] Assignee: OIS Optical Imaging Systems, Inc., Northville, Mich.

[21] Appl. No.: 09/057,601

[22] Filed: Apr. 9, 1998

[51] Int. Cl.$^6$ .................. G02F 1/1337; G02F 1/1347
[52] U.S. Cl. .................. 349/129; 349/127; 349/128; 349/136; 349/117
[58] Field of Search .................. 349/75, 117, 118, 349/119, 124, 127, 128, 129, 136, 179, 191; 428/1; 252/299.01; 430/20

[56] References Cited

U.S. PATENT DOCUMENTS

| | | |
|---|---|---|
| 5,016,989 | 5/1991 | Okada . |
| 5,155,611 | 10/1992 | Yamazaki et al. . |
| 5,198,917 | 3/1993 | Togashi . |
| 5,249,070 | 9/1993 | Takano . |
| 5,262,882 | 11/1993 | Hikmet .................. 349/127 |
| 5,309,264 | 5/1994 | Lien et al. . |
| 5,460,748 | 10/1995 | Mazaki et al. .................. 252/299.01 |
| 5,473,455 | 12/1995 | Koike et al. . |
| 5,479,282 | 12/1995 | Toko et al. . |
| 5,499,126 | 3/1996 | Abileah et al. . |
| 5,504,604 | 4/1996 | Takatori et al. . |
| 5,528,401 | 6/1996 | Narataki et al. .................. 349/127 |
| 5,559,618 | 9/1996 | Mori . |
| 5,583,679 | 12/1996 | Ito et al. .................. 349/118 |
| 5,589,963 | 12/1996 | Gunning, III et al. .................. 349/119 |
| 5,599,478 | 2/1997 | Matumoto et al. .................. 428/1 |
| 5,612,801 | 3/1997 | Winker .................. 349/119 |
| 5,619,352 | 4/1997 | Koch et al. .................. 349/89 |
| 5,808,716 | 9/1998 | Gass et al. .................. 349/127 |
| 5,831,700 | 11/1998 | Li et al. .................. 349/129 |

*Primary Examiner*—William L. Sikes
*Assistant Examiner*—Tai V. Duong
*Attorney, Agent, or Firm*—Joseph A. Rhoa

[57] ABSTRACT

A multi-domain liquid crystal display includes multiple liquid crystal alignment domains per pixel. In certain embodiments, only a single mechanical buffing step is required per substrate to provide the multiple domains per pixel. A continuous base underlying mechanically buffed alignment layer is provided, and a reactive alignment layer is provided thereon. The reactive alignment layer is doped so as to cause twist of molecules therein. The reactive layer may be photo-polymerizable and patterned so as to form an array of alignment portions and expose/uncover a corresponding array of areas of the underlying buffed alignment layer. Thus, liquid crystal molecules contacting the patterned reactive alignment portions are aligned in one direction while liquid crystal molecules contacting the exposed mechanically buffed polyimide layer are aligned in another direction. Multiple domains are thus provided, with only a single mechanical buffing step being necessary.

22 Claims, 14 Drawing Sheets

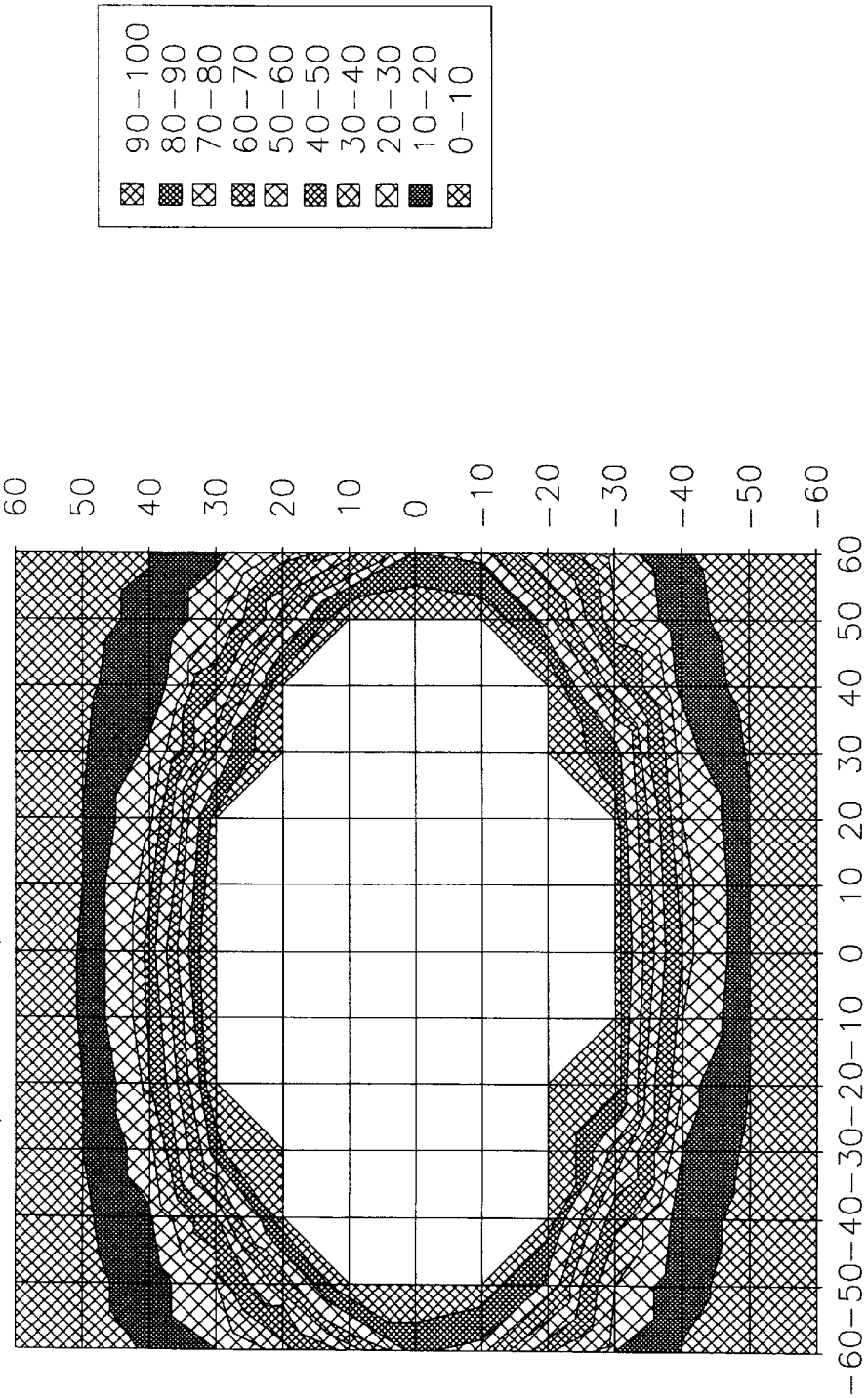

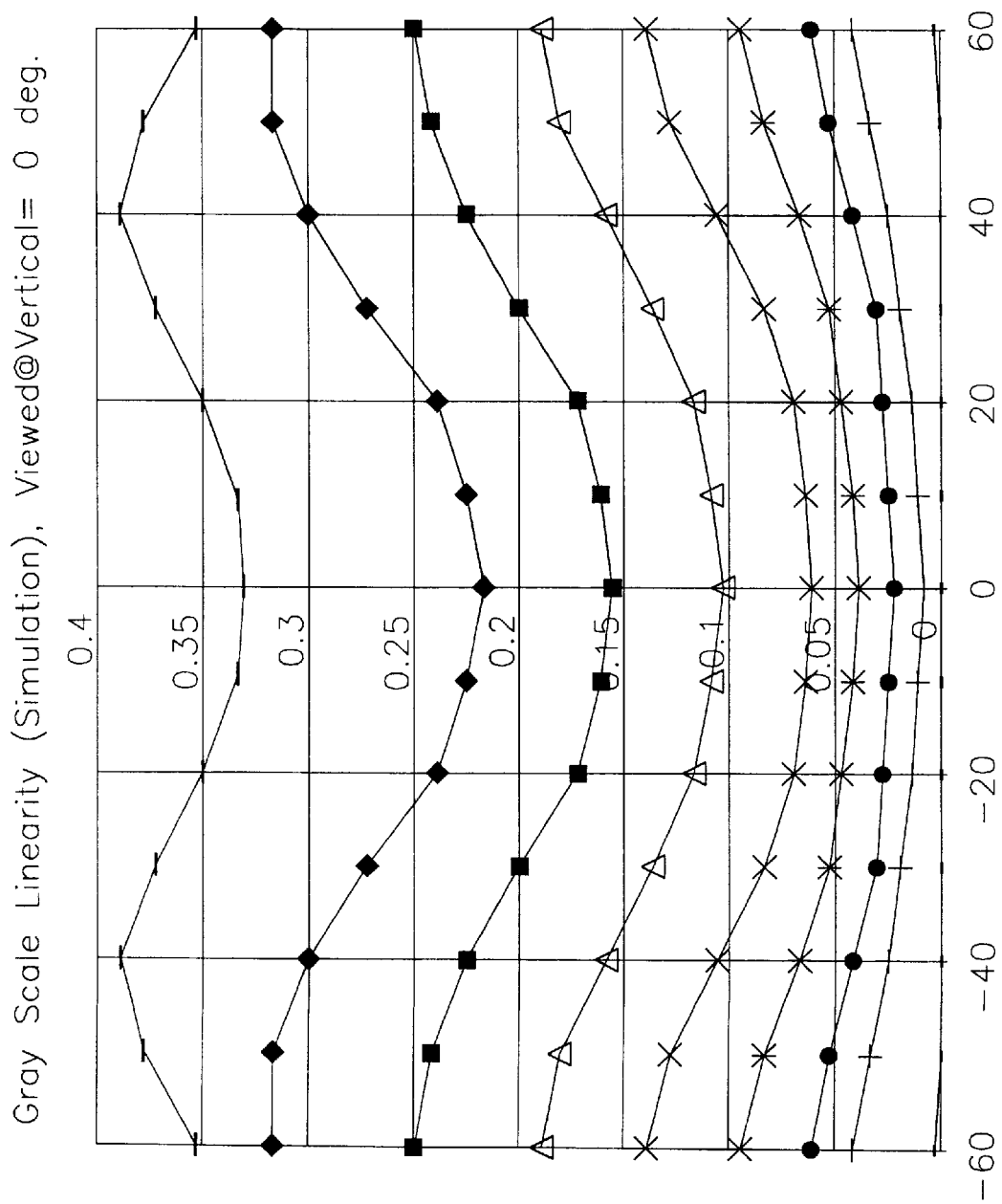

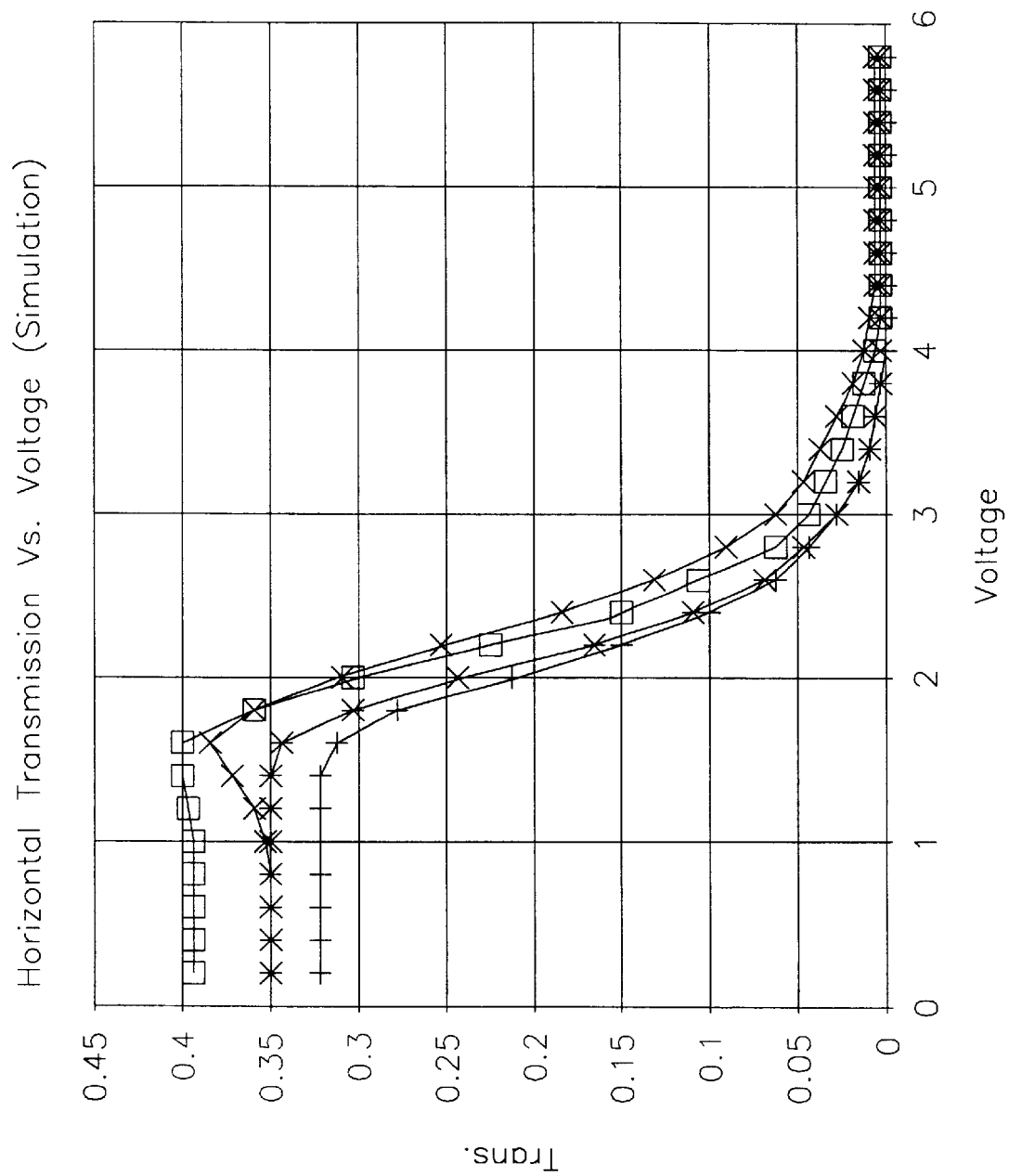

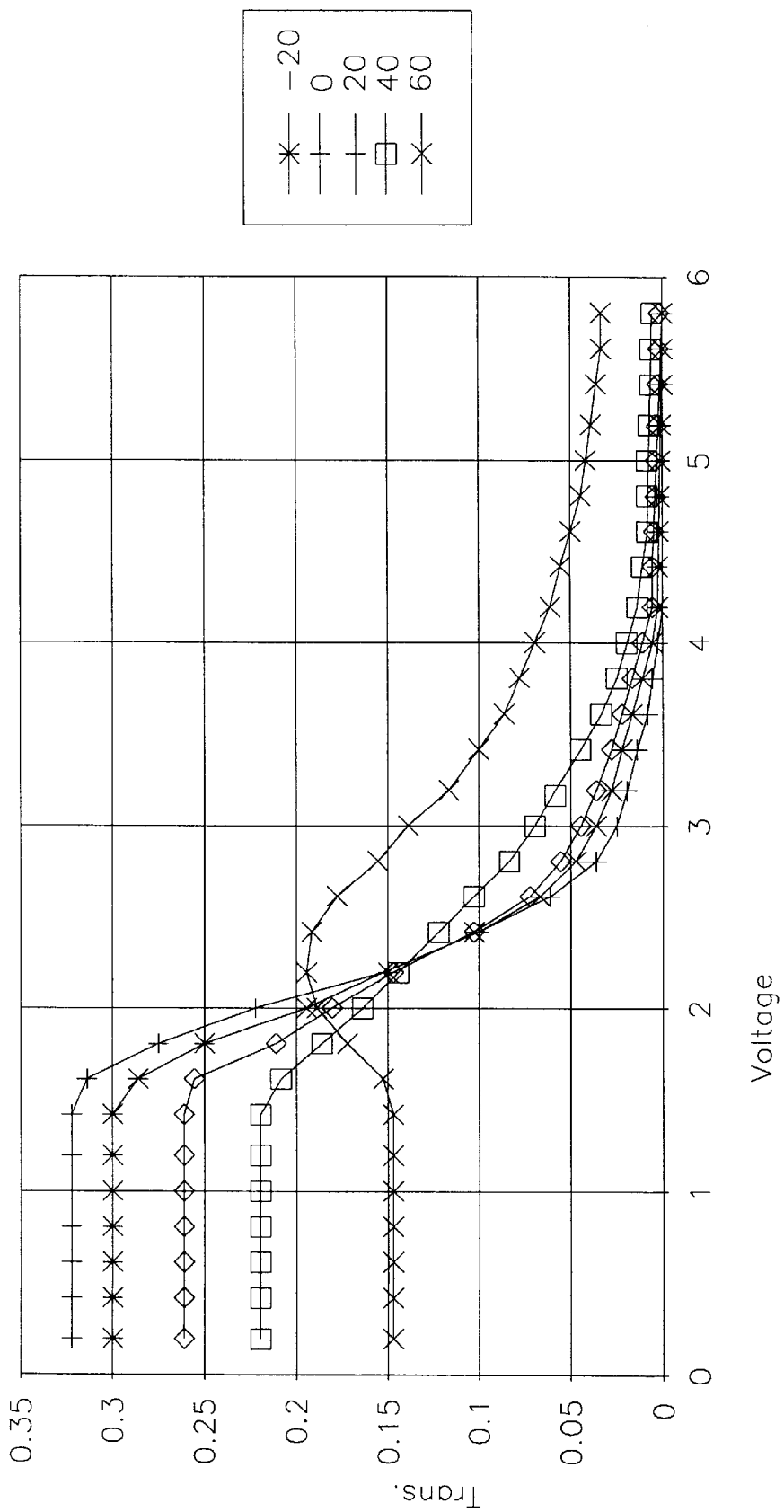

MULTI-DOMAIN LCD AND METHOD OF MAKING SAME

This invention relates to a liquid crystal display and method of making same. More particularly, this invention relates to a multi-domain liquid crystal display (LCD), and a corresponding method of making same with the method having a reduced number of buffing steps required.

BACKGROUND OF THE INVENTION

Typical single domain LCDs include a front alignment film and a rear alignment film. For example, see U.S. Pat. Nos. 5,594,568 and 5,576,861, the disclosures of which are incorporated herein by reference. In single domain LCDs, the front alignment film typically has a buffing or orientation direction which is substantially perpendicular (i.e. approximately 90° angled) to the buffing or orientation direction of the rear alignment film. In other words, the buffing directions of the front and rear alignment films are defined in parallel planes, but differ in direction by approximately 90°. Unfortunately, such single domain displays suffer from non-symmetric viewing cones. Transmission changes with viewing angle, which creates regions of low contrast and/or regions of gray level reversal. This non-symmetry is caused in part by mono-domain or single domain alignment in typical 90° twisted nematic LCDs, and the resulting liquid crystal (LC) director profile.

Mechanically buffed polyimide layers are typically used as alignment/orientation films. These alignment layers are coated on the interior of opposing substrates of the display, and are intended to be in immediate contact with the directly adjacent LC (i.e. liquid crystal material). Cigar-shaped molecules of the LC are adjacent to the alignment layers and take on the same orientation as the corresponding alignment layer adjacent thereto. An anchoring force of the polyimide holds the immediately adjacent LC molecules in a fixed position. LC molecules not in contact with the alignment layers are not anchored, and these molecules can change orientation with an applied voltage as is known in the art.

A significant disadvantage of mono-domain or single domain twisted nematic LCDs is a non-symmetric director profile in the vertical direction. Such non-symmetry creates an angular dependent phase retardation. Polarized light incident on such an LCD from different viewing angles will experience different phase retardation. The result is that light exiting the LCD at different angles will have different polarization states and thus cannot be equally transmitted to a viewer through the polarizer or analyzer on the viewer side of the display. Such asymmetric LC director profile translates into an asymmetric display transmission as a function of viewing angle. Contrast ratio losses for some viewing angles results. Image reversal at certain viewing angles can also occur. Both of these effects are detrimental to image quality and viewing characteristics.

It is known in the art that director profile symmetry can be improved by having multi-alignment directions within a single pixel (i.e. multi-domain or two-domain LCDs). For example, see U.S. Pat. Nos. 5,589,963; 5,309,264; 5,479,282; and 5,249,070, the disclosures of which are hereby entirely incorporated herein by reference. In multi-domain LCDs, although each individual alignment direction produces non-symmetry, the combined or overall optical effect of the multi-domains creates a substantially symmetric viewing cone having substantially uniform contrast and gray levels over viewing angles.

Unfortunately, prior art multi-domain systems having been difficult to commercially implement for at least the following reasons. Firstly, prior art mechanical rubbing used to create alignment directions is undesirable. It is very difficult to achieve more than one rubbing direction per pixel or subpixel using such mechanical rubbing. It has been suggested that in order to achieve multi-domain feature via mechanical rubbing, first a polyimide coated substrate must be rubbed in a first direction, then a mask must be aligned with pixel or subpixel features and another step of rubbing performed in a second direction which is perpendicular to the first direction. Such mask use and alignment is difficult, inefficient, and burdensome. Additionally, the second mechanical rubbing can damage the alignment properties of the first rubbing. An additional shortcoming of mechanical rubbing is that each alignment direction requires a separate mechanical buffing step (i.e. at least two buffing steps are required), with this large number of steps increasing cost and decreasing yields of LCD manufacturing.

Photo-alignment methods can be utilized to create multi-domain displays. However, such methods are very difficult to implement in a manufacturing environment. For example, disadvantages of photo alignment methods include the fact that material for such methods is often unavailable, and that the requirement for expensive high irradiance polarized ultraviolet (UV) exposure systems is undesirable. Long exposure times also limit manufacturing throughput. Another shortcoming of photo alignment methods is pre-tilt degradation over time which is caused by exposure to the sun or other UV sources.

Prior art FIGS. 1(a) and 1(b) illustrate a two-domain LCD from U.S. Pat. No. 5,589,963. The display of FIGS. 1(a) and 1(b) includes rear polarizer 1, front polarizer or analyzer 3, liquid crystal layer 5, rear substrate 7, front substrate 9, liquid crystal molecules 11, rear rubbing direction 13, rear rubbing direction 15, front rubbing direction 17 which is perpendicular to rubbing direction 13, and front rubbing direction 19 which is perpendicular to opposing rubbing direction 15, and compensator 21. There are two pixels/subpixels 20 illustrated in FIG. 1(a), with each square pixel/subpixel 20 having two different rub/orientation directions on each side of the LC layer. For example, each pixel/subpixel 20 includes rub directions 13 and 15 on the rear side of the LC and corresponding rub directions 17 and 19 on the other side of the LC. Unfortunately, the two-domain LCD of FIGS. 1(a) and 1(b) suffers from the problems discussed above.

It is apparent from the above that there exists a need in the art for an improved multi-domain liquid crystal display (LCD), and an improved method of making same. Such an improved display, and corresponding method, would enable a multi-domain display to be made with only one buffing step required per substrate. Additionally, it would be useful to be able to vary or adjust buffing directions so as to be able to achieve a wide range of arbitrary alignment directions without having to mechanically buff or photo align orientation materials/layers. It would also be advantageous to have a photoimageable or photopatternable alignment layer on each substrate, so that the alignment layer, after having been oriented, could be patterned (e.g. via photo-imaging using photolithography) into a plurality of pixilated or discrete members to form an array.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a pixel in an LCD, the pixel comprising:

first and second substrates;
a nematic liquid crystal layer sandwiched between the first and second substrates;
a first mechanically buffed or photo-aligned alignment layer provided on the first substrate, the first alignment layer being buffed so as to define a first alignment direction;
a second alignment layer which is not mechanically buffed, the second alignment layer disposed directly adjacent the first alignment layer, and molecular twisting in the second alignment layer enabling the second alignment layer to define a second alignment direction which is different than the first alignment direction, wherein molecules of the second alignment layer which contact the first alignment layer are oriented in the first alignment direction and molecules in the second alignment layer which contact the nematic liquid crystal layer are aligned in the second alignment direction; and
the liquid crystal layer contacting each of the first alignment layer and the second alignment layer so that the pixel has two alignment domains or directions defined by the first and second alignment directions which are defined on the first substrate, wherein liquid crystal molecules of the liquid crystal layer which contact the first alignment layer are oriented in the first alignment direction and liquid crystal molecules of the liquid crystal layer which contact the second alignment layer are oriented in the second alignment direction.

This invention further fulfills the above-described needs in the art by providing an LCD comprising:
a substrate;
a liquid crystal layer;
a mechanically buffed alignment film defining a first alignment direction, the mechanically buffed alignment film supported by the substrate;
a reactive liquid crystalline alignment layer disposed on the mechanically buffed alignment film so that molecules of the reactive liquid crystalline alignment layer contacting the mechanically buffed alignment layer are oriented in substantially said first alignment direction, and molecules of said reactive liquid crystalline alignment layer contacting the nematic liquid crystal layer are aligned in a second alignment direction which is substantially different than said first alignment direction, so that the liquid crystal layer contacts each of the mechanically buffed alignment film and the reactive liquid crystalline alignment layer.

This invention further fulfills the above-described needs in the art by providing a method of making an LCD, the method comprising the steps of:
providing a first substrate;
depositing a first alignment film on the first substrate;
mechanically buffing or photo-aligning the first alignment film to define a first alignment direction;
depositing a reactive alignment layer on the substrate so as to be in direct contact with the mechanically buffed or photo-aligned alignment film, the reactive alignment film defining a second alignment direction substantially different than the first alignment direction;
photo-imaging the reactive alignment film so as to expose certain areas of the underlying alignment film; and
providing a liquid crystal layer which contacts each of the underlying mechanically buffed or photo-aligned alignment film and the reactive alignment film so that the liquid crystal layer has at least two alignment directions or domains in a pixel of the display.

This invention will now be described with respect to certain embodiments thereof, accompanied by certain illustrations, wherein:

IN THE DRAWINGS

Figure 6:
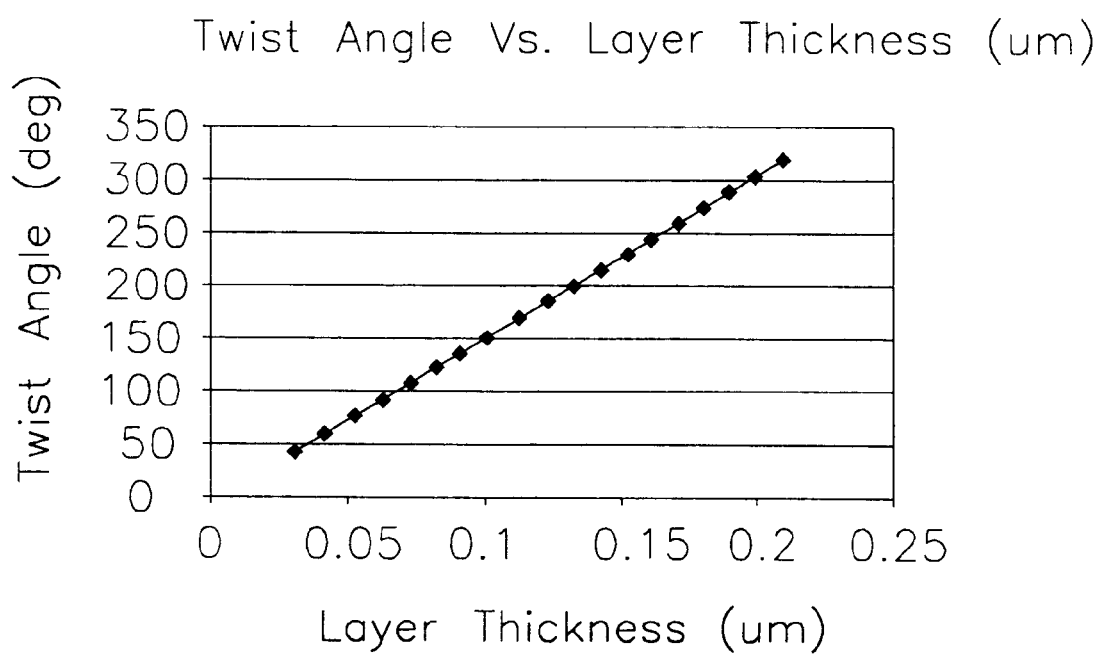
Figure 7C:
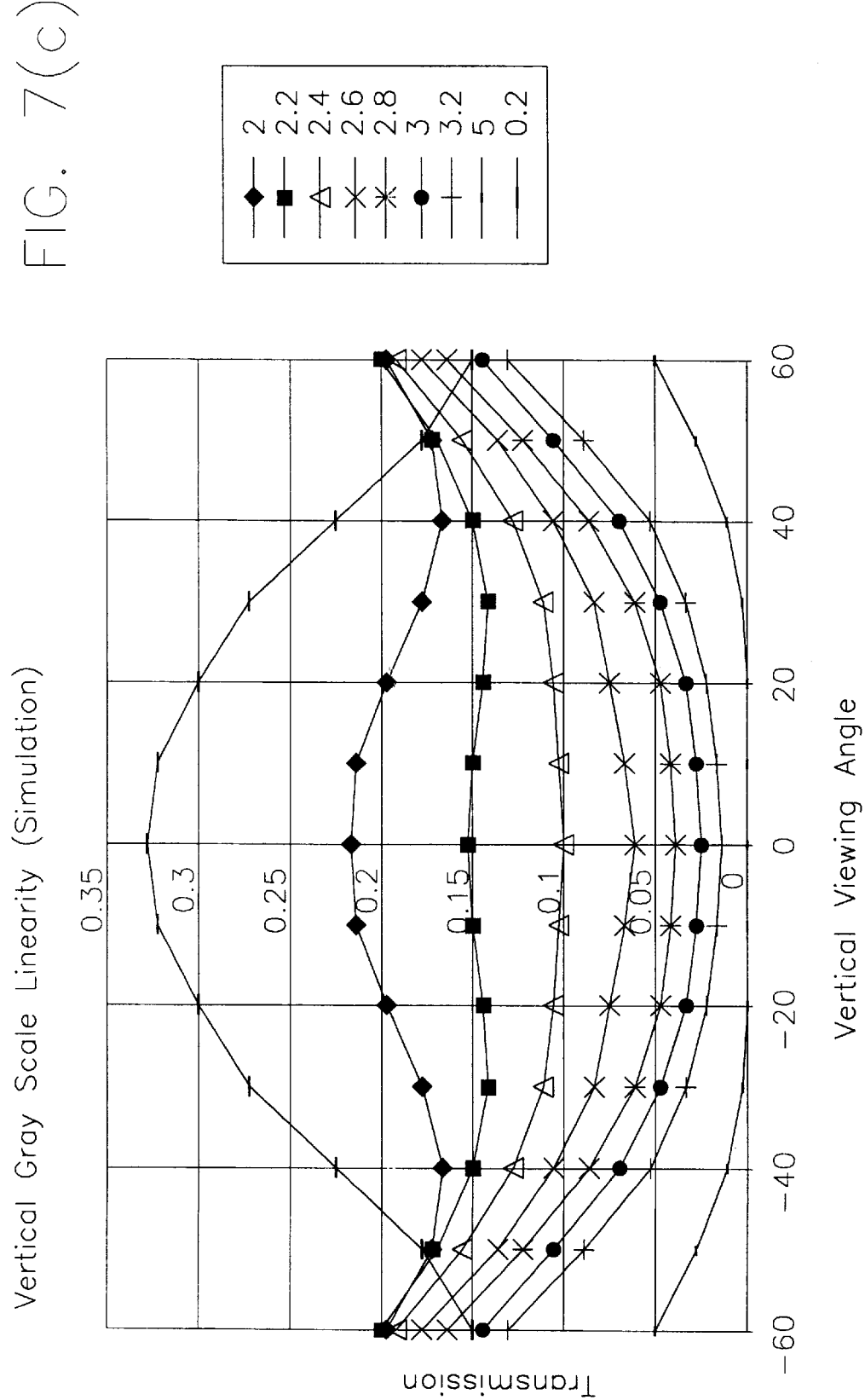
Figure 8A:
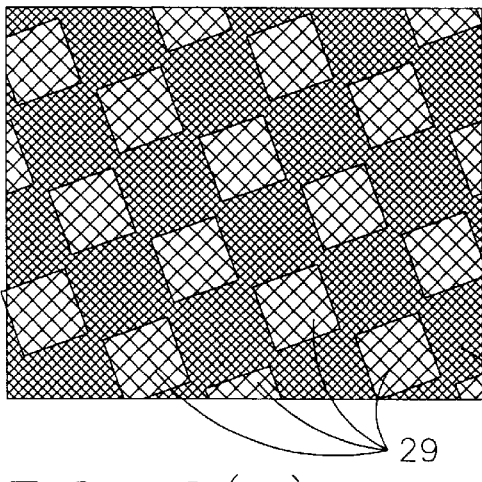
Figure 8B:
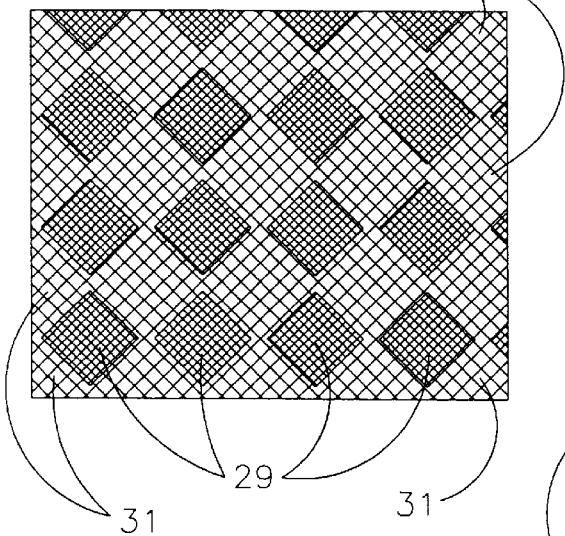
Figure 8C:
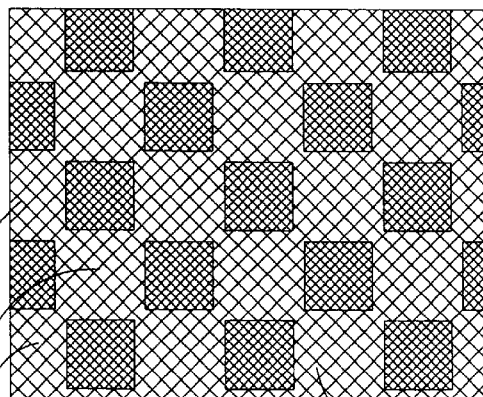
Figure 8D:
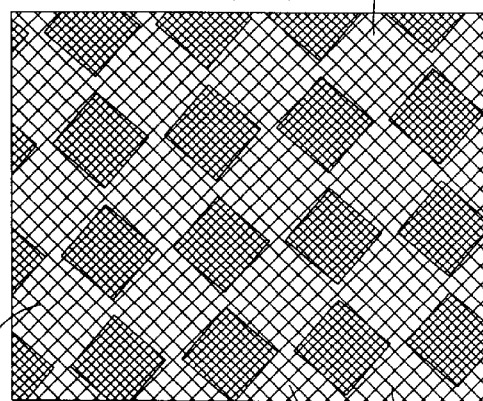
Figure 8E:
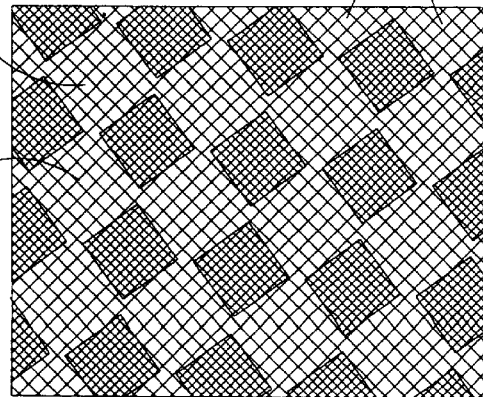

FIG. 6 is a thickness versus twist angle graph illustrating the twist of an alignment/orientation layer as a function of its thickness when a given amount of chiral dopant (either right-handed or left-handed chiral dopant may be used to induce twist in reactive layers herein) is provided in the layer. This figure illustrates how the twist angle of the alignment layer can be optimized or varied by changing the thickness of the layer when a known amount of twist-inducing dopant is provided in the layer.

Figure 1A:
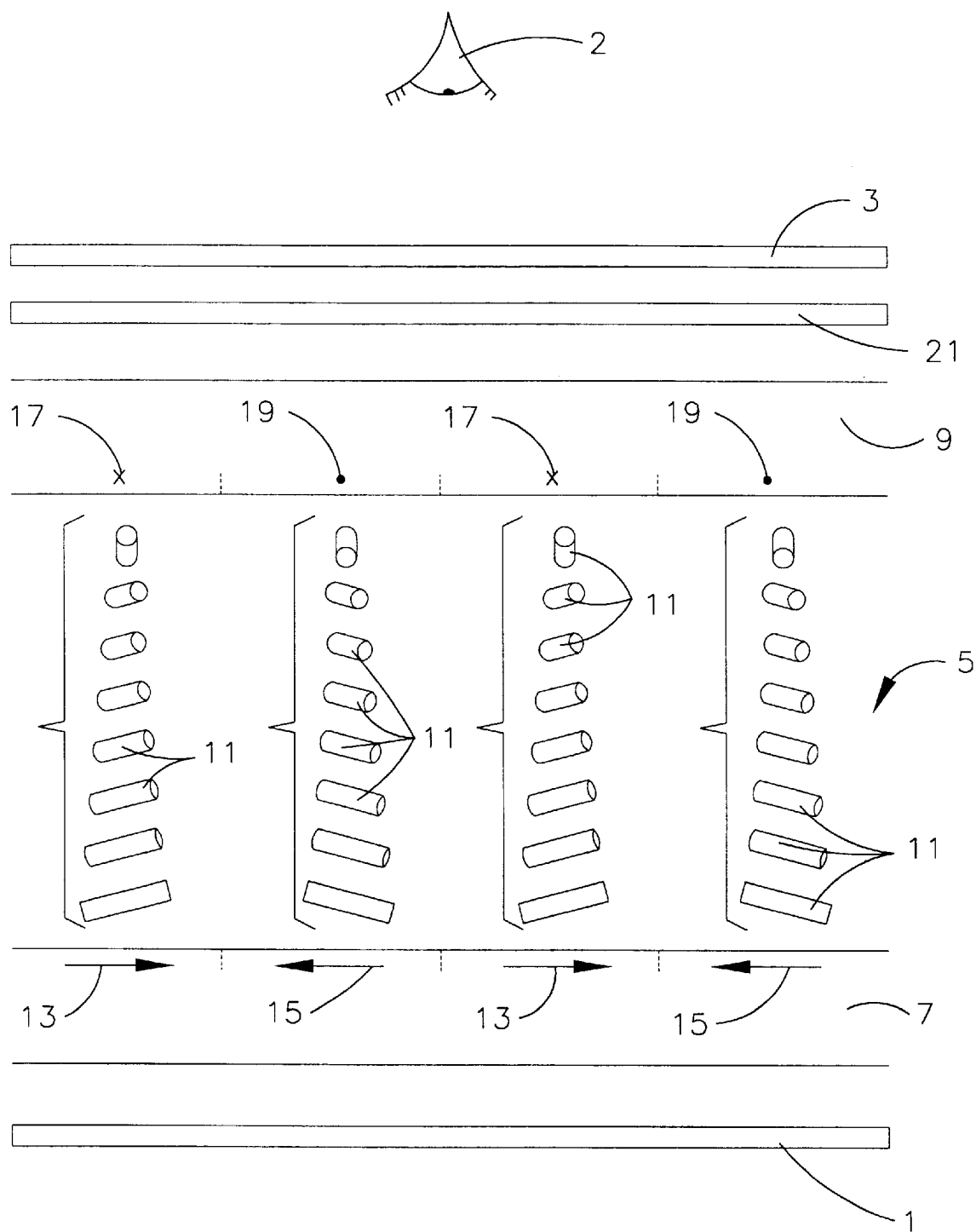
FIG. 1(a) is a prior art side cross-sectional view of a two-domain twisted nematic LCD.
Figure 1B:
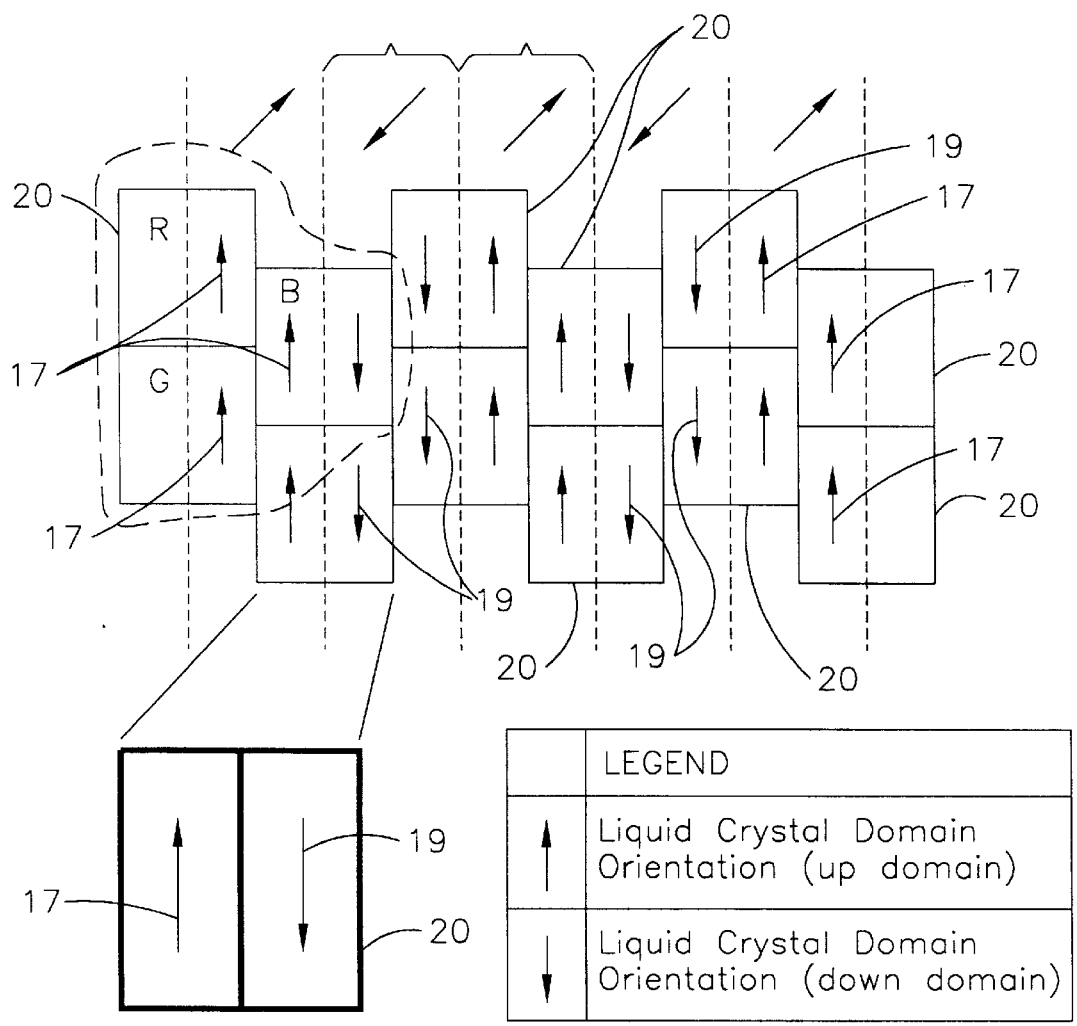
FIG. 1(b) is a top plane view of the prior art passive substrate from FIG. 1(a), including two alignment domains per pixel.
Figure 2:
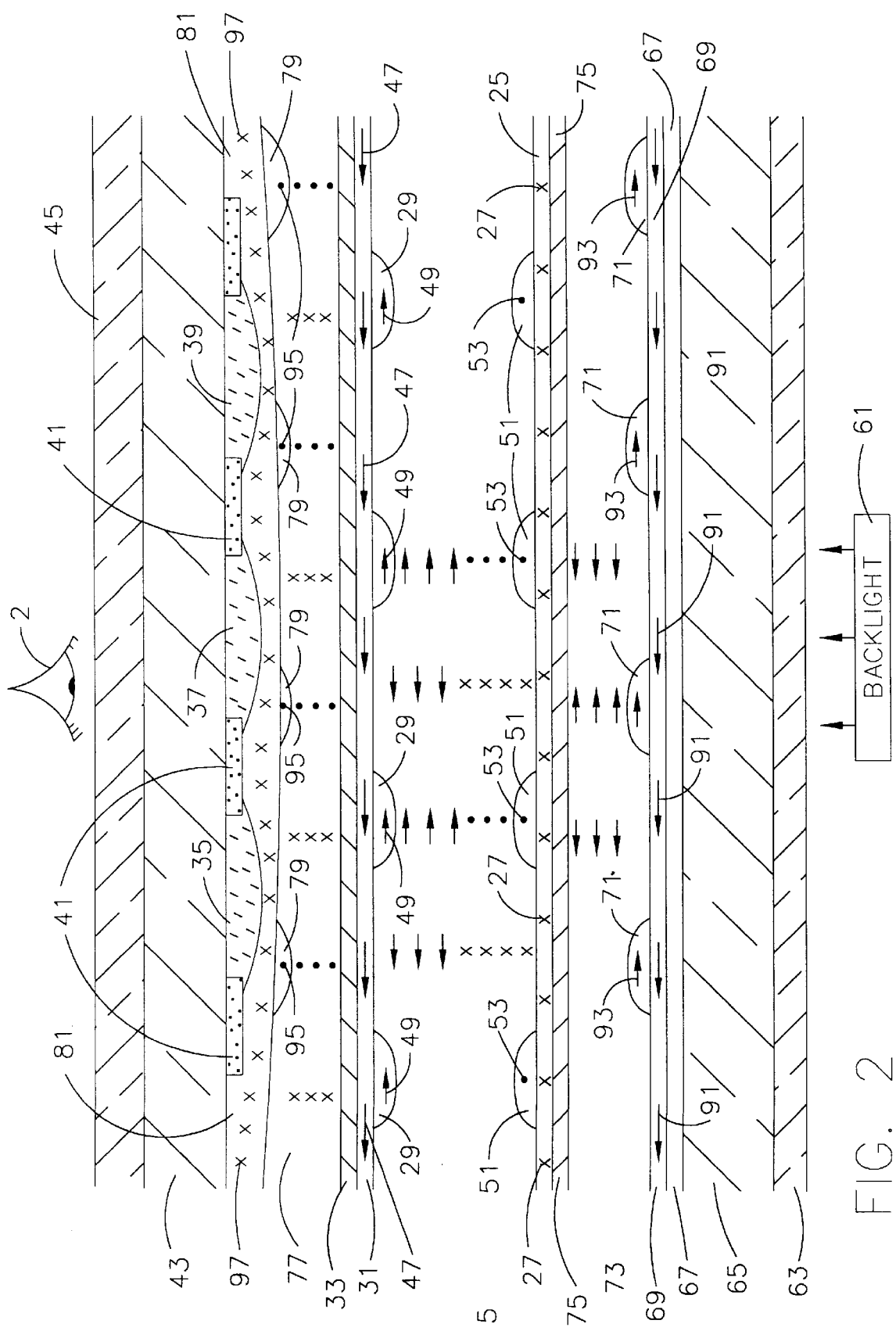
FIG. 2 is a side cross-sectional view of a multi-domain LCD according to an embodiment of this invention, this display including multi-domain orientation on each substrate as well as a patterned retarder on each substrate.

FIGS. 7(a)–7(e) are simulation graphs of a light valve according to the FIG. 2 embodiment of this invention where the LC was about 4 $\mu$m thick, $n_e$ of the LC was 1.564, and $n_o$ of the LC was 1.478.

FIGS. 8(a)–8(e) are top plan view photographs of a multi-domain alignment layer according to an embodiment of this invention, where a plurality or an array of alignment members are provided on the substrate.

DETAILED DESCRIPTION OF CERTAIN EMBODIMENTS OF THIS INVENTION

Now referring more particularly to the accompanying drawings where like reference numerals indicate like parts throughout the several views.

Improvement of vertical gray level symmetry may be achieved by creating multiple (e.g. two or four) domains or alignment directions per pixel (e.g. colored subpixel) herein. In two domain embodiments, for example, six o'clock and twelve o'clock alignments are averaged creating a substantially symmetric viewing cone.

In certain embodiments of this invention, the number of mechanical rubbing or photo-aligning steps required for LCD manufacture is kept to a minimum. Thus, multiple domains may be achieved per pixel while minimizing the number of mechanical rubbing steps per substrate (e.g. to one per substrate). In certain embodiments, this may be achieved by coating a reactive alignment layer [e.g. reactive mesogen RM 257 (reactive photo-polymerizable liquid crystalline) plus dopant (e.g. chiral dopant)] onto an already mechanically rubbed or photo-aligned layer (e.g. pre-rubbed polyimide). RM 257 may be a photo-curable and photo-patternable material which may have added thereto photoinitiators, and a photo-cured layer of RM 257 can provide from about 5–30° of tilt adjacent an LC layer and can thus align adjacent LC molecules in a manner similar to known mechanically buffed polyimide alignment layers. The reactive alignment layers herein (e.g. RM 257) enables control of pre-tilt angles in such layers adjacent layers to be aligned because the amount of dopant added thereto controls pre-tilt angles, so that the reactive alignment layers define pre-tilt angles adjacent the nematic LC in the range of from about 5–20°, and more preferably from about 7–15°, and most preferably about 10°, as measured from the substrate plane. Thus, the pre-tilt angle of the reactive alignment layers herein adjacent the LC layer is greater than the pre-tilt angle of underlying mechanically buffed polyimide alignment layers which ranges from about 2–5° from the plane.

The dopant forces a twisting molecular alignment of the reactive alignment layer throughout its thickness, with the dopant in certain embodiments also affecting and enabling control of the pre-tilt angle. Patterning (e.g. photo-imaging) of the reactive alignment layer removes part of that layer thereby exposing an array of portions of the underlying "already mechanically rubbed" or photo-aligned layer so as to form an array of the reactive alignment portions over the pre-rubbed layer. Thus, alignment domains are formed using the reactive layer by coating the reactive material plus a chiral dopant onto a mechanically rubbed layer, photo patterning the reactive layer to form an array of reactive alignment portions, and then rinse developing the array of reactive alignment portions in certain embodiments to remove the nonexposed portions. Note that the RM 257 plus chiral dopant mixture may also have a small amount of photo-initiator agent therein that polymerizes or crosslinks the RM 257 when it is exposed to UV (ultraviolet) energy or radiation during the photopatterning step. The reactive alignment layer has uniaxial tilting and twisting structure that aligns with its underlying substrate (e.g. buffed polyimide layer) in certain embodiments.

The result is that alignments at the top and bottom (the "bottom" being adjacent the mechanically rubbed alignment layer) of the reactive alignment layer are in different directions, with the angle between the different directions being determined by each of molecular twist, and the thickness of the reactive alignment layer, and the amount of dopant therein. The alignment direction at the bottom of the reactive alignment layer is that of the underlying rubbed layer (e.g. the buffed polyimide layer) while the alignment direction at the top of the reactive alignment layer (i.e. at the top of each array portion of reactive material) is determined by the reactive layer's thickness and the amount of dopant therein, as these two parameters determine the degree to which the molecules in the reactive alignment layer twist through the thickness thereof. In such a manner, multiple domains can be created using only one mechanical rubbing or photo-aligning step per substrate (i.e. only the underlying layer has to be mechanically rubbed or photo-aligned). One domain is created by the reactive alignment layer and the other domain is created by the underlying alignment layer (e.g. polyimide) in the areas where the reactive alignment layer was removed. This can be used to either form only multiple domain LCDs, or also to form multiple domain LCDs with patterned retarders therein. It is also noted that two, four, and other numbers of alignment domains per pixel are encompassed by this invention. It is also noted that the underlying alignment layer can be created in a variety of manners, for example, mechanically rubbed polyimide, photo-aligned polyimide, photo-aligned polymers, oblique vapor deposition, or other known methods.

In certain embodiments, the reactive alignment film(s) herein may be polymerized thin films of organic liquid crystalline materials with dopant therein (e.g. chiral dopant), such materials having a varying of tilt angle of the optical symmetry axis relative to the film surface so as to have a splayed structure. Additionally, in alternative embodiments of this invention, the reactive alignment layers may be formed of sematic liquid crystalline with chiral dopant, and the mechanically rubbed alignment layers herein may in certain embodiments of this invention be replace with other types of buffed or aligned layers, such as oblique SiO, photo-oriented layers, etc.

While illustrated embodiments herein show and describe twisted nematic LCDs, it is recognized that this invention is also applicable to other types of displays including super-twisted nematic LCDs, vertically aligned LCDs, etc.

Figure 3A:
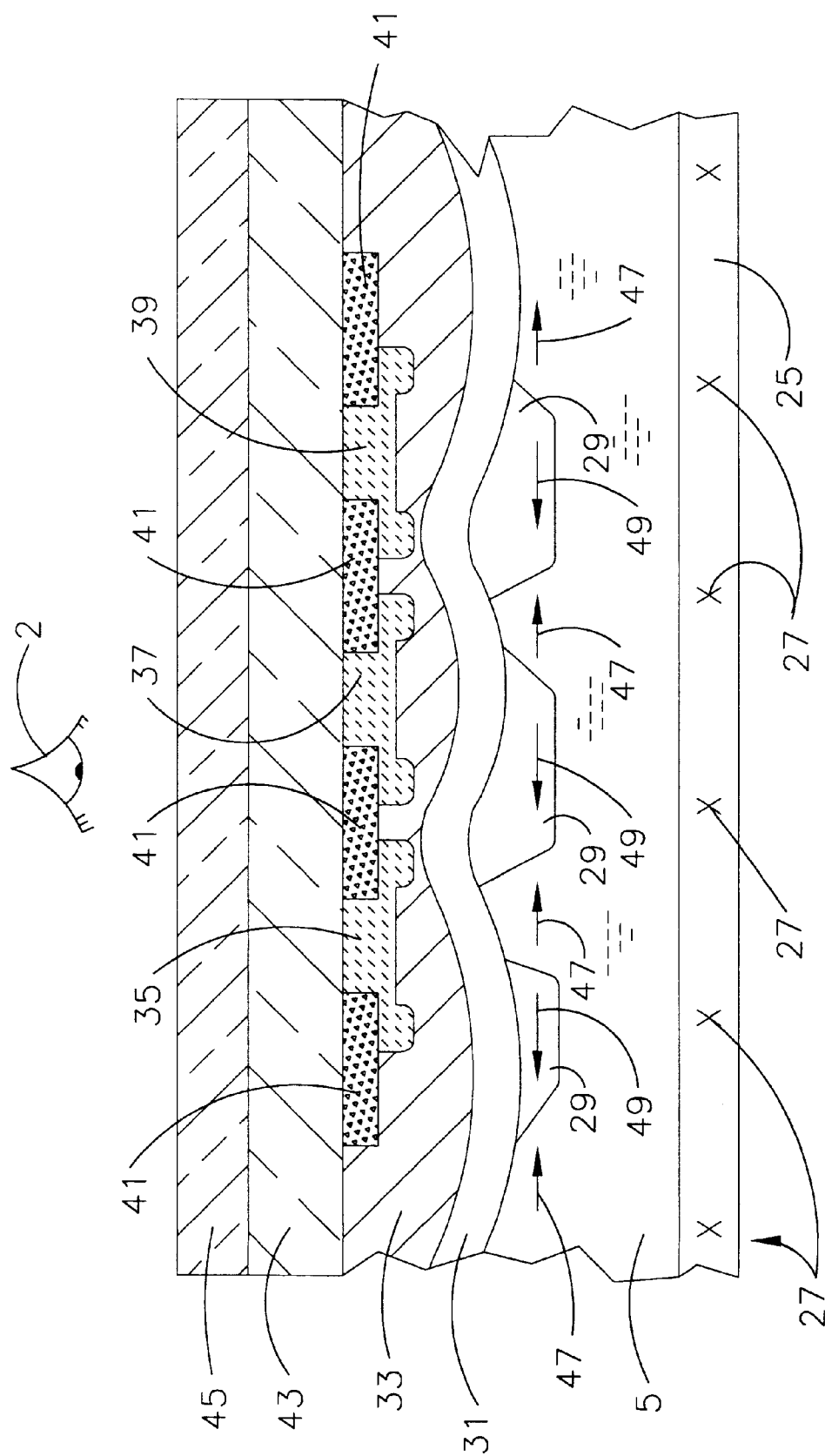
FIG. 3(a) is a side cross-sectional view of a portion of a multi-domain LCD according to another embodiment of this invention, wherein one substrate has multi-domain alignment and the opposing substrate has mono-domain alignment.

FIG. 3(a) illustrates a twisted nematic LCD or AMLCD according to an embodiment of this invention where one substrate has multiple (e.g. two) domains per pixel ("pixel" herein means full pixel or colored subpixel). In the FIG. 3(a) embodiment, the upper substrate (i.e. passive substrate closest to viewer 2) has two different alignment (or orientation) directions or domains per pixel, while the opposing substrate (e.g. active substrate) has only a single alignment direction per pixel (i.e. mono-domain).

The FIG. 3(a) LCD includes a rear polarizer (not shown), rear active substrate (not shown), rear pixel electrodes (not shown), rear alignment/orientation film 25 (e.g. conventional polyimide buffed alignment film) having only a single alignment direction 27 across the substrate, twisted nematic liquid crystal layer 5, reactive alignment portions 29 that were photo-imaged or patterned from a single layer, underlying mechanically buffed alignment layer 31 (e.g. rubbed polyimide), common electrode 33 (e.g. substantially transparent indium-tin-oxide or ITO), red color filter 35, green color filter 37, blue color filter 39, patterned black matrix material 41, front or passive substrate 43 which is made of glass or plastic and is substantially transparent to visible wavelengths of light, and finally front polarizer or analyzer 45 which has a linear transmission axis. During manufacture, a layer of alignment material (e.g. reactive mesogen RM 257 [available from Merck] doped with chiral dopant additive) is coated on base mechanically buffed alignment layer 31, with the reactive alignment layer thereafter being patterned (e.g. via photo-imaging using a mask) to form an array of discrete members or portions 29 across the substrate and thus exposing an array of portions of underlying layer 31. The LCD outputs image data to viewer 2 through front polarizer 45.

Still referring to FIG. 3(a), underlying front polyimide alignment layer 31 (i.e. the base alignment layer which may be mechanically buffed) has an alignment direction 47 which is oriented substantially perpendicular to the opposing alignment direction 27. Meanwhile, reactive alignment portions 29, which overlie base alignment layer 31, have an alignment direction 49 which is different that direction 47. Thus, LC molecules in LC layer 5 which contact base alignment layer 31 in between portions 29 are aligned in direction 47 and are anchored in this direction by the buffed surface of layer 31. In a similar manner, the LC molecules of layer 5 which contact appropriate parts of reactive alignment portions 29 are aligned in direction 49 and are anchored in this direction by the surface of the reactive alignment material making up portions 29.

In certain embodiments, reactive alignment direction 49 is oriented from about 160–200° from direction 47 (preferably approximately 180°, or anti-parallel). Thus, in certain embodiments directions 47 and 49 are both substantially perpendicular to direction 27 on the opposing substrate, with directions 47 and 49 being anti-parallel to one another in certain embodiments. The alignment portion 29 has a twisting molecular structure. The side of alignment portion 29 in contact with 31 is aligned substantially parallel to 31, while the side of alignment portion 29 in contact with LC layer 5 is aligned substantially anti-parallel to 31.

FIGS. 8(*a*)–8(*e*) are photographs each illustrating, after a layer of reactive alignment material has been photo-imaged into an array of portions 29 (RM 257 with chiral dopant added thereto in these pictures), an array of alignment portions 29 on underlying base mechanically rubbed polyimide alignment layer 31. Thus, while underlying alignment layer 31 is substantially continuous across the display's viewing area, reactive alignment layers/portions 29 are pixilated across the viewing area of the display so that, e.g. each pixel in the display on one substrate has one portion 29, and thus one part of each pixel has an alignment direction 49 from the portion 29 and another part (e.g. half) of the pixel has an alignment direction 47 from an exposed part of layer 31.

Still referring to FIG. 3(*a*), the alignment direction 49 created by layer/portions 29 is a function of both the thickness of layer/portions 29 and the amount of dopant (e.g. chiral dopant) added to the host reactive alignment material. Cigar shaped molecules of the host reactive material (e.g. RM 257) doped with the chiral additive align with rub direction 47 adjacent layer 31 and then twist through the thickness of the reactive alignment layer 29. The result is a molecular direction 49 on the air side (i.e. the side closest to LC layer 5) of layer(s) 29 that is substantially different than the molecular direction 47 on the side of layer 29 adjacent layer 31. The molecular orientation in layer 29 on the air side defines the new alignment direction 49 adjacent the nematic LC layer 5 molecules.

If the reactive alignment material was deposited on base layer 31, with no dopant being added thereto, then directions 47 and 49 would be approximately the same. However, when the dopant is added to the host reactive alignment material, the dopant causes the reactive material to twist throughout the thickness of the layer, with the degree of twist being dictated by the amount of dopant added. Thus, a given amount of chiral dopant may cause molecules making up the reactive material to twist ten degrees per 0.01 $\mu$m thickness of the layer 29. Thus, given this amount of chiral dopant, if layer 29 is 0.01 $\mu$m thick then directions 47 and 49 would differ by 10°; if layer 29 is 0.02 $\mu$m thick then directions 47 and 49 would differ by 20°; if layer 29 is 0.09 $\mu$m thick then directions 47 and 49 would differ by 90° (alignments of 45, 135, 270, and 360° are optimal in embodiments where four different alignment directions or domains are provided per pixel); and if layer 29 is 0.18 $\mu$m thick then alignment directions 47 and 49 would differ by approximately 180° (optimal in two domain per pixel embodiments as shown in FIG. 3(*a*)). It is noted that either right-handed chiral dopant or left-handed chiral dopant can be used to induce twist in reactive alignment layers herein. For example, a four domain display can use two subpixels with a left-handed dopant giving 45 and 135° twist, and two subpixels with right-handed dopant giving −45 and −135° of twist.

Figure 4:
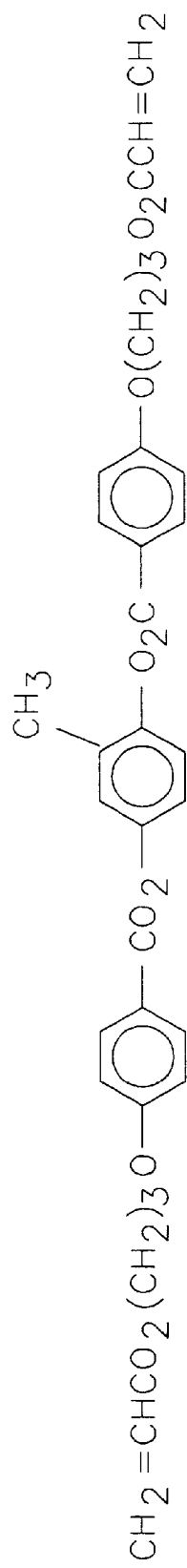
FIG. 4 illustrates the chemical structure of reactive mesogen, which is used as an orientation or alignment material according to certain embodiments of this invention.

In certain embodiments of this invention, the host reactive material making up much of layer(s) 29 is made up of RM 257 reactive mesogen obtainable from EM Industries, New York (Merck), this type of reactive alignment material being reactive liquid crystalline. FIG. 4 shows the chemical structure of RM 257. This reactive material has a solubility in BL090 at 20° C. (FOR PSCT type displays) of about 7%, and this material is also defined by the temperature ranges: 70 K-N/I (degrees C.), and 126 N-I (degrees C.). However, it should be recognized that other types of reactive materials, including but not limited to other types of reactive liquid crystalline, may be used instead of RM 257 in alternative embodiments of this invention.

While an infinite number of different angles defining the angular difference between alignment directions 47 and 49 are encompassed by this invention, in certain two domain embodiments (two different alignment or domain directions per pixel), directions 47 and 49 differ by from about 160–200°, preferably by about 180°. The following amounts of chiral dopant have been added to RM 257 to come up with the material for layer/portions 29: (i) 85% by weight RM 257, 15% by weight chiral dopant [these values are based on RM 257 and chiral dopant alone and do not include the amounts of photoinitiator and/or solvent(s) added to the mixture]; (ii) 89% RM 257, 11% chiral dopant; (iii) 92% RM 257, 8% chiral dopant; and (iv) 95% RM 257, 5% chiral dopant. In certain embodiments, the layer 29 material (exclusive or photoinitiators and solvents) includes from about 75–99% by weight RM 257 and from about 1–25% by weight chiral dopant; more preferably from about 80–99% RM 257 and 1–20% chiral dopant, and most preferably from about 88–93% RM 257 and 7–12% chiral dopant. However, an important aspect of certain embodiments of this invention is that by varying the percentage or amount of chiral dopant added to the reactive alignment material, any alignment direction 49 (from 0 to 360°) different from the original polyimide alignment direction 47 can be achieved.

The following is an exemplary makeup of a potential material for a reactive alignment layers herein according to a preferred embodiment of this invention (in grams): (a) RM 257 0.7776 (3.880298% total, 93.99936% actives), Irgacure 651 (Ciba-Geigy) (which is 2,2-dimethoxy-2-phenylacetophenone) 0.0087397 (0.043612% total, 1.056485% actives), ZLI-811 0.0409000 (0.204095% total, 4.944154% actives), and MEK (methyl ethyl ketone) 19.212460 (95.872% total). The total weight in this example was thus 20.039700 grams. This example is for exemplary purposes only and is not to be limiting of this invention. This polymerized layer is uniaxial tilting-twisting and has an average tilt angle of about 10–15°, and a twist angle between 0 and 360° depending upon layer thickness and the amount of dopant used.

The result of the FIG. 3(*a*) embodiment is an AMLCD including one substrate 43 having multiple (e.g. two) alignment domains 47, 49 per pixel and the opposing substrate having only one alignment domain 27 per pixel. An important characteristic of this embodiment is that the multiple alignment domains 47, 49 per pixel can be achieved on substrate 43 with only one mechanical buffing step. Layer 31 is mechanically buffed to create alignment direction 47 which functions to both orient and anchor LC molecules from layer 5 which contact layer 31, and also to orient and anchor molecules of reactive alignment layer(s) 29 which contact layer 31. As a result of layer 31 orienting and anchoring the molecules of reactive layer 29 which contact layer 31, the chiral dopant can cause the molecules of layer 29 to twist through the thickness of the layer until reaching another alignment direction 49 at the upper surface of layer 29 opposite layer 31. Thus, layer 29 need not be mechanically or photo buffed to form alignment direction 49. Only the mechanical buffing (or aligned by other methods) of layer 31 is needed. The result is a multiple domain display which is easier to make than prior art multiple domain displays, requires less steps to make than prior art multiple domain displays, is simpler to make than prior art multiple domain displays, and has improved viewing characteristics relative to conventional mono-domain LCDs.

Figure 3B:
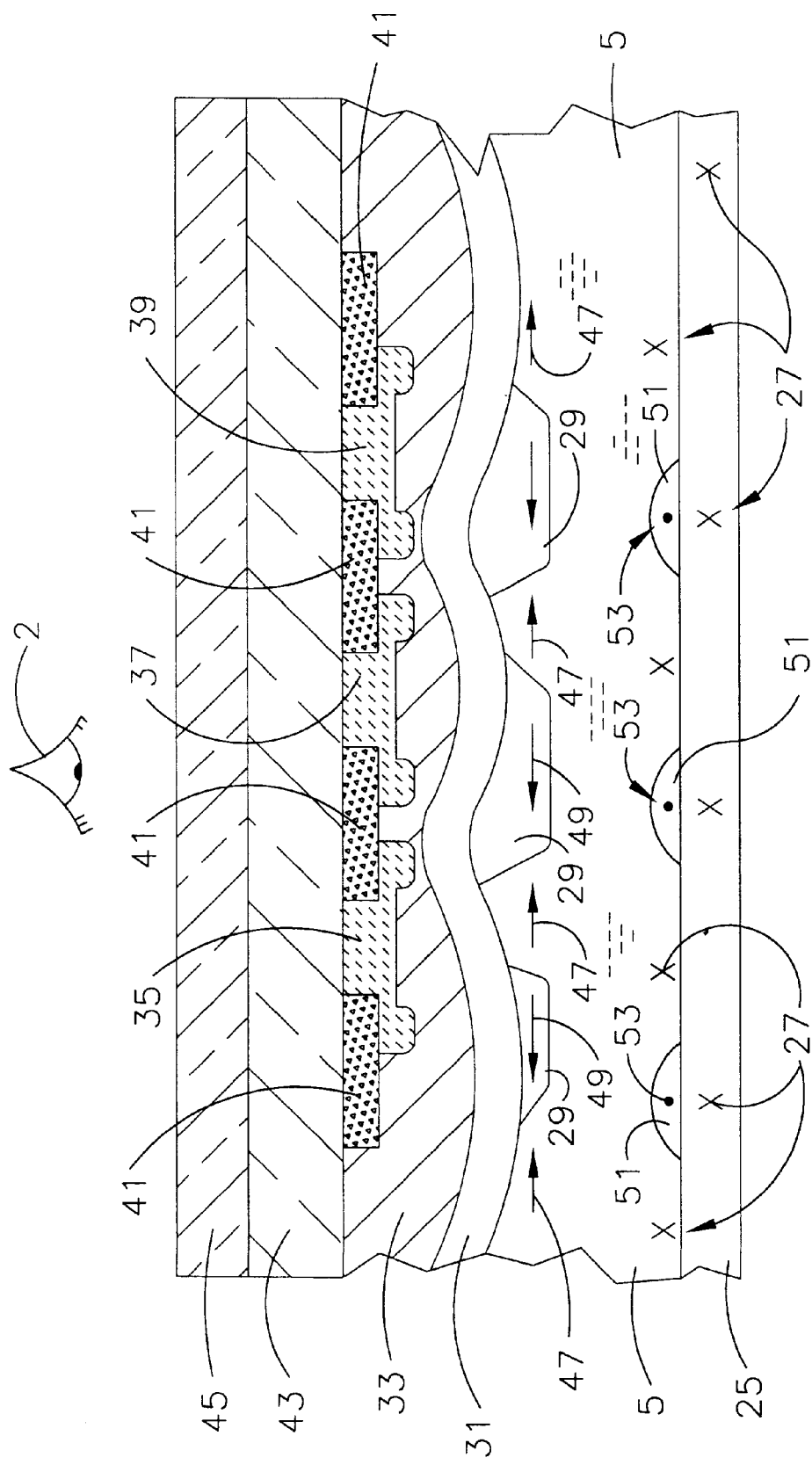
FIG. 3(b) is a side cross-sectional view of yet another embodiment of this invention, wherein each substrate has multi-domain alignment.

FIG. 3(b) is a side cross sectional view of another embodiment of this invention. The FIG. 3(b) embodiment is similar to the FIG. 3(a) embodiment, except that both substrates have multiple domain or multiple alignment directions. Thus, the only difference shown in FIG. 3(b) relative to FIG. 3(a), is that in FIG. 3(b) the active substrate (not shown) in FIG. 3(b) further includes an array of reactive alignment layers/portions 51 (e.g. RM 257 with chiral dopant additive) disposed on the underlying mechanically buffed alignment layer 25 (e.g. buffed polyimide). As with the passive substrate alignment layers, a continuous layer of reactive alignment material is deposited on underlying layer 25 and thereafter patterned (e.g. photo-imaged with UV radiation and a mask) into an array of portions 51. Each reactive alignment portion 51 has an alignment direction 53 which differs from direction 27 in preferred embodiments. Thus, LC molecules from layer 5 and layer molecules from 51 which contact layer 25 are aligned in direction 27, while LC molecules from layer 5 which contact the upper areas of layer(s) 51 are aligned in direction 53. In the embodiment illustrated in FIG. 3(b), alignment directions 27 and 53 differ from one another by approximately 180°. In certain embodiments, alignment portions 51 on the one substrate correspond to and line up with alignment portions 29 on the other substrate 43 so that directions 53 and 49 differ from one another by approximately 90° (e.g. from about 80–100°) and so that the LC layer 5 between portions 29 and 51 is thinner than it is between areas corresponding to alignment directions 27 and 47.

Still referring to FIG. 3(b), layers 51 and 29 may be of the same reactive material in certain embodiments. Also, the alignment direction 53 of each portion 51 may be the same, but could be different for different portions 51 in certain embodiments of this invention. Likewise, directions 49 in each portion 29 are preferably approximately the same, but could be different in each portion 29 in alternative embodiments of this invention in both FIGS. 3(a) and 3(b). It is also noted that with regard to the FIG. 3(a) embodiment of this invention, the multiple domain alignments may be located on either the active (i.e. TFT or diode inclusive) substrate or the passive substrate (i.e. the substrate not having the switching TFTs or diodes thereon).

Figure 5:
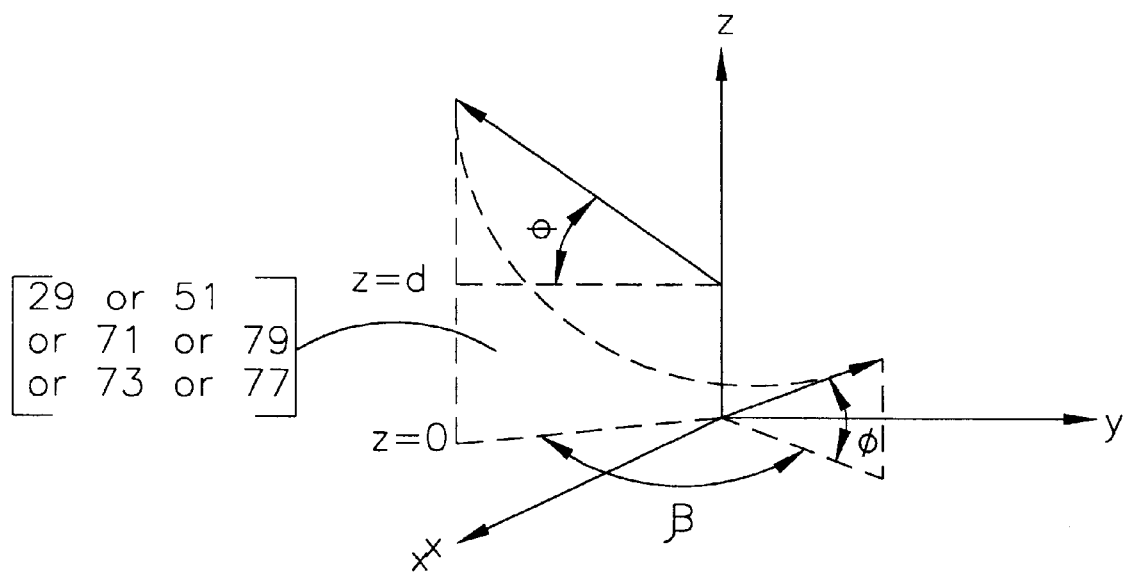
FIG. 5 illustrates an optical axis with increasing tilt and uniform twist through the layer thickness (the layer is an orientation/alignment layer in certain embodiments of this invention), where angles $\theta$ and $\phi$ are the polar tilt angles at the top and bottom of the layer, angle $\beta$ is the total twist angle, and "d" is the thickness of the orientation/alignment layer.

FIG. 5 illustrates each of reactive alignment layer 29 and 51, including an optical axis with increasing tilt and uniform twist (dictated by the amount of dopant added thereto) through the layer thickness, where angles θ and φ are the polar tilt angles at the top and bottom of the layer, angle β is the total twist angle, and "d" is the thickness of the orientation/alignment layer. The polar tilt angles are not substantially affected by the chiral dopant, and thus even without the dopant the layer(s) would have a varying tilt throughout the layer's thickness. However, as discussed above, the total twist (and thus the newly formed alignment direction 49, 53 defined by angle β) is a function of both the amount of chiral dopant added and the layer's thickness. The thickness is a determining parameter because the thicker the layer the more the molecules therein can twist and angle β can increase. An exemplary known chiral dopant that may be used in all RM 257 embodiments herein is chiral dopant ZL811, available from Merck. When β is approximately zero, then FIG. 5 illustrates tilted retarder layers 73 and 77 of the FIG. 2 embodiment of this invention.

Still referring to FIG. 5, it is noted that preadult angle φ is defined at the side or surface of the alignment layer (71, 51, 29, and 79) which contacts the mechanically buffed alignment layer, and tilt angle θ is defined on the surface or side of the reactive alignment layer which contacts the nematic liquid crystal layer 5. Thus, the tilt angle of molecules in the layers increases substantially continuously through the thickness of the layer from preadult angle φ to tilt angle θ defined on the air side of the layer. This tilt angle description applies not only to the reactive alignment layers in certain embodiments of this invention, but also to the tilted retarders 73, 77 in certain embodiments. It is noted that because the amount of chiral dopant added to the host material (e.g. reactive liquid crystalline) controls twist angle β, this angle is close to or exactly zero for retarder layers in certain embodiments when no such dopant is added thereto. It is noted that tilt angle θ when no chiral dopant is in a reactive liquid crystalline layer is from about 36–40°, preferably about 38° with RM 257, but when chiral dopant is added to the host material then this angle θ decreases as a function thereof. Thus, angle θ in alignment layers herein where chiral dopant is present may be from about 5–20°, preferably about 10°. Thus, the pre-tilt in the domain in each pixel defined by the mechanically buffed layer is low (e.g. from about 2–5°) and the pre-tilt in the other domain in each pixel defined by the reactive twisting layer is higher than the buffed pre-tilt, with this higher pre-tilt angle defined by the reactive layers being from about 5–20°, and most preferably about 10°.

A downside of mixing multiple alignment directions on a pixel level is reduction of the contrast viewing envelope. This loss of contrast can be corrected by using a patterned or pixilated retardation approach, where the patterned retarders are positioned internally to the twisted nematic (TN) LCD.

FIG. 2 is a side cross sectional view of yet another embodiment of this invention. This embodiment combines the features of the embodiments of FIGS. 3(a) and 3(b) with a pixel personalized retarder feature (i.e. pixilated retarders). The FIG. 2 display includes from the rear forward, backlight 61, rear linear polarizer 63, rear substantially transparent substrate 65 made of glass or plastic, active layer 67 including an array of switching thin film transistors (TFTs), diodes, or the like of selective addressing pixels of the display, rear mechanically buffed retarder alignment layer 69 (e.g. polyimide conventionally used as orientation film), reactive rear retarder alignment layers/portions 71 each including a reactive material (e.g. RM 257) with chiral dopant added thereto, rear continuous but pixilated retarder 73 (e.g. uniaxial tilted retarder with varying tilt through thickness of retarder), rear pixel electrode(s) 75 (e.g. of ITO), rear mechanically buffed alignment layer 25 (e.g. polyimide), reactive alignment layers/portions 51 (e.g. may be of same material as in previous embodiments and optionally of same material as 71), twisted nematic LC layer 5, reactive alignment layers/portions 29, mechanically buffed alignment layer 31 (e.g. polyimide), front patterned substantially transparent common electrode 33 (e.g. ITO), front pixilated retarder 77 (e.g. uniaxial tilted retarder with varying tilt angle through thickness of retarder), front reactive retarder alignment layers/portions 79, front mechanically buffed retarder alignment layer 81 (e.g. polyimide), color filters 35, 37, and 39, black matrix 41, front substrate 43, and front linear polarizer or analyzer 45.

The FIG. 2 embodiment adds to the FIG. 3(b) embodiment pixel personalized retarder(s), optionally provided on each side of LC layer 5. Retarders 73 and 77 in certain embodiments of this invention are uniaxial tilted retarders whose tilt angle varies through the thickness of the layer. Each retarder 73, 77 is pixel personalized in that each retarder is not the same across the display's entire viewing area. For example, in the embodiment shown in FIG. 2, each retarder has one of its retardation axes or axis changed by the presence of reactive alignment layer(s) 71, 79. Thus, the retardation effect and/or retardation value of retarder 73 and/or retarder 77 changes across the viewing area of the LCD due to additional retarder alignment layers 71, 79. Internal and pixilated compensation as disclosed in this embodiment can utilize tilted retardation layer(s) to improve the contrast envelope of the display, although the process steps required for same are increased.

In certain embodiments, layers 73 and 77 may be of an undoped reactive liquid crystalline such as RM 257 which includes molecules whose tilt varies throughout the thickness of the layer (i.e. tilted retarders). The RM 257 used for retarders 73 and 77, unlike the same material used for reactive alignment layers discussed herein, is either not chiral doped or chiral doped to some very small degree. Thus, there is no substantial twisting that takes place by molecules of retarders 73, 77. With regard to retarder 73, its molecules contacting polyimide mechanically buffed alignment layer 69 are oriented and anchored in direction 91, while the molecules of retarder 73 contacting reactive alignment portions 71 are oriented and anchored in direction(s) 93. Because layer(s) 71 are chiral doped, direction(s) 93 may be different from direction 91 by any angle between 0–360°, although in certain preferred embodiments angles 91 and 93 differ from one another by from about 70–210°, preferably from 160–200°, and most preferably by approximately 180°. Because tilted retarder layer 73 has substantially different molecule orientation and anchoring directions 91 and 93 on the backlight side of the layer, then the retardation effects caused by retarder 73 will necessarily be different in areas aligned by 91 than in areas aligned by 93. In other words, because the optical axes or axis of the retarder 73 will be differently aligned in areas adjacent 91 than in areas adjacent 93, then the retarder 73 will retarder light in different manners in these two types of areas across the viewing area of the LCD. Still further, because the thickness of retarder layer 73 is larger proximate alignment areas 91 than proximate alignment areas 93, the retardation values adjacent areas 91 and 93 will be different thereby creating additional difference between the retarders in these different areas. Thus, a pixilated or pixel personalized retarder may be achieved in such a manner using only one retardation layer and requiring only a single mechanical buffing or photo-aligning step to align layer 69. In certain embodiments, it is possible for each portion 71 to have a different alignment direction 93 and/or a different thickness thereby enabling even more latitude in adjusting retarder 73 across the display. In FIG. 2, cross (i.e. "x") alignment directional symbols indicate directions into the page and dot directions out of the page.

Retarder 77 is provided in a similar manner and is substantially the same as retarder 73 except that it is on the opposite substrate. Retarder reactive alignment layers/portions 79 align molecules of retarder 77 contacting 79 in direction(s) 95 while molecules of retarder 77 contacting exposed areas of mechanically buffed polyimide alignment layer 81 are aligned in a different direction 97. As with retarder 73, one, two, or more alignment directions 95, 97 may be provided per pixel; and in certain embodiments, an entire pixel may have one retarder alignment direction 97 while an adjacent pixel has only one retarder alignment direction 95.

However, an alternative embodiment of this invention, retarders 73 and/or 77 may be of reactive material which is doped (e.g. with right-handed or left-handed chiral dopant) in order to induce molecular twist therein. In such embodiments, the retarder(s) would have both a varying tilt and molecular twist throughout thickness(es) of the retarder layer(s).

Thus, in certain embodiments of this invention, each of alignment layers 25, 31, 69 and 81 may be made of the same mechanically buffed or photo-aligned alignment material (e.g. buffed polyimide). Also, each of reactive non-mechanically-buffed alignment layers 29, 51, 71, and 79 may be made of the same reactive alignment material (e.g. RM 257) doped with either the same of different amounts of a dopant (e.g. chiral dopant). Also, tilted retarder layers 73 and 77 may be made of the same material (e.g. RM 257) as the reactive alignment layers except that the material in the retarder layers 73, 77 is not doped, or not substantially doped so that there is no or little molecular twist therein. This enables the LCD to be more easily manufactured with reduced numbers of steps.

In the illustrated FIG. 2 embodiment, directions 91 and 93 are substantially anti-parallel (i.e. 160–200°) relative to one another, as are directions 95 and 97. Also, alignment directions 27 and 53 are substantially anti-parallel to one another as are directions 47 and 49. Directions 49 and 53 are substantially perpendicular to one another, as are directions 27 and 47.

Still referring to the FIG. 2 embodiment of this invention, each of retarder layers 73 and 77 may be from about 0.2 to 2.0 μm thick, more preferably from about 0.8 to 1.5 μm thick, and most preferably from about 1.0–1.15 μm thick. Each of layers 73 and 77 in certain embodiments preferably has a d·Δn value of from about 15 to 180 nm, more preferably from about 50–150 nm, and most preferably from about 80–110 nm, wherein Δn is defined by $n_e - n_o$ of the material making up layers 73 and 77. This invention further includes embodiments where only one of retarders 73 and 77 is provided, so that there is only a retarder on one side of LC layer 5, and also includes embodiments wherein multiple retarders 73, 77 are provided on each side of LC layer 5.

According to certain embodiments of this invention, reactive alignment layers 29, 51, 71, and 79 may each be from about 0.05 μm to 0.75 μm thick, preferably from about 0.08 to 0.25 μm thick, and most preferably from about 0.10–0.15 μm thick. Value Δn at 543 nm wavelength, defined by the difference in indices of refraction ($n_e - n_o$), of each of reactive alignment layers may be from about 0.075–0.095 in certain embodiments, more preferably from about 0.080–0.090, and most preferably about 0.086.

FIG. 6 is a graph illustrating how the twist angle β (and thus the alignment direction 49, 53, 93, 95 of a reactive non-mechanically-buffed alignment layer) of a doped reactive alignment layer 29, 51, 71, 79 increases substantially linearly as a function of the thickness of the layer 29, 51, 71, 79. FIG. 6 of course assumes a given or constant amount of chiral dopant for each point on the graph. When the amount of chiral dopant is approximately 0, then FIG. 6 would have zero slope and would equal 0 twist and would illustrate tilted retarders 73 and 77. Thus, while both the tilt angle and twist of the reactive alignment layers vary throughout the thickness of such layers, retarders 73 and 77 differ from the reactive alignment layers in that there is no "twisting" variation throughout the thickness of the retarders.

The FIG. 2 embodiment of this invention will be now be described with respect to the following example in which an LCD was simulated as shown in FIG. 2.

First, substantially transparent glass substrates 43 and 65 are provided. TFTs were provided on active substrate 65 as disclosed, for example, in U.S. Pat. No. 5,641,974, the disclosure of which is incorporated herein by reference. With regard to passive substrate 43, black matrix portions 41 are deposited and patterned thereon, and thereafter color filters 35 (red), 37 (green) and 39 (blue) are deposited and patterned on substrate 43.

Then, on substrate 65, a conventional polyimide alignment layer 69 is deposited substantially continuously across the substrate and thereafter mechanically buffed in a known manner to provide alignment direction 91 across the interior surface of layer 69. Then, a substantially continuous layer of RM 257 (i.e. twisting alignment layer), which is substantially transparent, is deposited (e.g. spin coated) over top of mechanically buffed layer 69. The continuous RM 257 layer (doped with chiral dopant) is then photoimaged or photopatterned (e.g. by exposure to UV light through a shadow mask with a photolithography process and then development) so as to remove portions thereof so as to expose/uncover areas of underlying base buffed layer 69. The patterned RM 257 layer is then developed, so as to remove unexposed portions of the layer, by rinsing with MEK (methyl ethyl ketone) which is a development solution. The result is an array of new reactive alignment portions 71 overlying layer 69, with portions 71 having alignment directions 93 and exposed/uncovered areas of buffed layer 69 having alignment direction 91. As with other reactive layers herein, this layer also may have an optical axis of increasing tilt and uniform twist throughout the thickness of the layer (see FIG. 5). Each reactive alignment layer herein may have an air side tilt of about 38°, and broadly speaking such a tilt within the range of from about 20–50° (adding of various surfactant(s) can control the air side tilt angle which occurs adjacent the layer to be aligned, by decreasing air side tilt and increasing twist angle). Retarder alignment directions 91 and 93 are for the purpose of alignment of molecules is of tilted uniaxial retarder layer 73.

Each of the reactive alignment layers described herein (e.g. RM 257) may be of a photo-polymerizable or photo-curable liquid crystalline monomer in certain embodiments, although it is recognized that other monomers will also suffice. It is also noted that all reactive alignment layers herein, in certain embodiments of this invention, may function as both alignment layers and as retarders (e.g. uniaxial tilted retarders). Note that the addition of a photoinitiator agent for crosslinking the reactive material may or may not be required.

After retarder portions alignment 71 have been formed, another layer of RM 257 (this time not doped with chiral dopant) is deposited (e.g. spin-coated) substantially continuously across the viewing area of the display so as to form tilted uniaxial retarder layer 73. This layer is a splay/retarder layer. Layer 73 is then UV cured. Molecules of retarder layer 73 which contact alignment portions 71 are aligned and anchored in direction(s) 93, while molecules of layer 73 which contact retarder alignment layer 69 are aligned in direction 91. Directions 91 and 93 are different by approximately 180° (i.e. anti-parallel). This different alignment of one surface of layer 73 causes retardation effects caused by layer 73 to differ in the differently aligned areas. Thereafter, pixel electrodes (e.g. transparent ITO) 75 may be formed on substrate 65 over retarder layer 73, with each pixel electrode contacting a corresponding switching device (e.g. TFT) through a via or contact hole (not shown) formed in layers 69 and 73. See, for example, the '974 patent referenced above by such vias.

Then, another conventional polyimide alignment layer 25, which is substantially continuous, is deposited on substrate 65 and mechanically buffed to form alignment direction 27. Thereafter, chiral doped reactive LC twisting alignment layer (of RM 257) is spin coated on top of mechanically buffed layer 25 and thereafter photoimaged to form reactive LC alignment portions 51 having alignment direction(s) 53. Portions 25 are then developed by rinsing with MEK. The reactive alignment layers are directly photo-patterned (e.g. UV polymerized) and do not require a photoresist coating and photoresist stripping step. Thus, reactive alignment layers herein have their alignment directions proximate the layer (e.g. nematic LC layer) to be aligned controlled by dopant (e.g. chiral dopant) added to the host material of the reactive alignment layer, and not by mechanical buffing and not by exposure to polarized UV light.

In order to implement the instant invention, it is possible that improved nitrogen air flow may have to be provided in the stepper.

Turning now to substrate 43, conventional polyimide layer 81 is deposited substantially continuously across substrate 43 in the display's viewing zone, and thereafter mechanically buffed to form retarder alignment direction 97. Then, a chiral doped reactive alignment layer of RM 257 is spin-coated onto the surface of buffed layer 81 substantially across the entire viewing area of the display. This reactive alignment layer is photoimaged (i.e. photopatterned) and developed by rinsing with MEK so as to form reactive retarder alignment portions 79 on substrate 43. The result is a plurality of mechanically buffed retarder alignment direction 97 portions and a corresponding plurality of portions 79 which provide retarder alignment in directions 95. Next, a non-chiral-doped layer of RM 257 is spin coated substantially across the entire viewing area of the display so as to form tilted retarder layer 77. Layer 77 is then UV cured. Molecules of layer 77 which contact portions 79 are aligned in directions 95, while molecules of layer 77 which contact mechanically buffed polyimide layer 81 are aligned in direction 97. These different alignment directions of the molecules of retarder 77 cause different retardation effects in the differently aligned areas of the retarder.

After retarder 77 has been spin-coated on substrate 43 as discussed above, a common electrode (e.g. of substantially continuous ITO) is deposited onto substrate 43 across the viewing area so as to form layer 33. Then, another conventional polyimide layer 31 is formed substantially continuously across substrate 43 over top of ITO layer 33, with polyimide layer 31 thereafter being mechanically buffed in direction 47. Then, another chiral doped layer of twisting alignment RM 257 is spin-coated onto layer 31 and thereafter photopatterned, and developed by rinsing with MEK, to form alignment portions 29. Each alignment portion 29 has an alignment direction 49.

After substrates 43 and 65 have been provided with their corresponding circuitry, retarders 73, 77, and alignment layers, a layer of twisted nematic liquid crystal material 5 is provided or sandwiched between the two substrates as shown in FIG. 2. Layer 5 is about 4 μm thick between the mechanically buffed layers in this example. Molecules of liquid crystal layer 5 which contact layer 31 are oriented in direction 47, molecules of LC layer 5 which contact layer 25 are oriented in direction 27, molecules of LC layer 5 which contact reactive alignment portions 29 are oriented in directions 49, and molecules of LC layer 5 which contact reactive alignment portions 51 are oriented in alignment directions 53. Thus, we have a multi-domain liquid crystal display. For this particular example, each pixel in the display had two alignment directions. Thus, each pixel on the active matrix side had one alignment portion 51 with alignment direction 53 and an adjacent alignment portion with alignment direction 27; and the same pixel on the passive substrate side had one alignment portion 29 including direction 49 and an adjacent alignment direction 47 caused by layer 31.

In this particular example, LC layer 5 was approximately 4.0 μm thick between mechanically buffed layers 25 and 31, and approximately 3.6 μm thick between bumps or corresponding reactive alignment portions 29 and 51. Also, alignment directions 47 and 49 were angled approximately 180° (i.e. anti-parallel) relative to one another, as were directions 95 and 97. Likewise, directions 27 and 53 were angled approximately 180° relative to one another, and alignment directions 91 and 93 were also angled approximately 180° relative to one another. Each direction 53 was substantially the same, as was each direction 93. On the passive substrate side, each direction 95 was substantially the same, as was each direction 49, although this need not be the case in all embodiments. Because, for example, alignment directions 47 and 49 were anti-parallel to one another, this means that each portion 29 had a twist of approximately 180° (i.e. angle β in FIG. 5 was 180°). This was the same for the other reactive alignment portions in this example. In this example, $n_e$ of RM 257 was 1.564, and $n_o$ was 1.478. Thus, Δn was 0.086 for the RM 257 which made up layers 69, 71, 73, 25, 51, 29, 31, 77, 79, and 81. All of these RM 257 layers were chiral doped to substantially the same extent, except that uniaxial tilted retarder layers 73 and 77 had no chiral dopant. This display was assimilation. The d·Δn value (i.e. retardation value) of each retarder 73 and 77 was approximately 95 nm in this particular example.

FIGS. 7(*a*)–7(*e*) are simulation graphs resulting from the assimilated example discussed above relative to the FIG. 2 embodiment of this invention. FIG. 7(*a*) is a contrast ratio plot showing that the normally white display had a very symmetric viewing cone, and good viewing characteristics and high contrast ratios at large viewing angles. FIGS. 7(*b*)–7(*e*) illustrate improved gray level behavior.

The embodiments discussed above relate mainly to retarder and/or liquid crystal alignment layers/systems. However, this invention is also applicable to LCDs which include conventional liquid crystal alignment, and multi-domain retarder alignment as it is described herein. In such embodiments, the liquid crystal layer may be aligned solely by conventional mechanically rubbed or photo-aligned layers. However, the display may include one or more retarder layers which have different alignments on one surface thereof as shown in FIG. 2. For example, a display may include an array of pixels/subpixels, with each pixel/subpixel having its own personalized or pixilated type of retarder by utilizing a reactive alignment portion 71, 79 in some pixels and an exposed/uncovered underlying mechanically buffed or photo-aligned alignment layer 91, 97 in other pixels. In such a manner, some pixels in the display could have a retarder surface aligned in direction 91, for example, and other pixels in the display have the same retarder surface aligned in direction 93, for example. In this type of embodiment, retarder alignment directions 91 and 93 are different by from about 1–359° in order to induce different types of retardation effects in different pixels. In still further embodiments of this invention, a single pixel may have multiple alignment directions, such as directions 91 and 93 shown in FIG. 2. It is also possible for a single pixel/subpixel to have more than two different retarder alignment directions. In each of the above retarder embodiments, only one surface of the retarder need have multiple alignment directions. However, it is contemplated that both opposing surfaces of a retarder may have multiple alignment directions in certain embodiments of this invention.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A pixel in a liquid crystal display, the pixel comprising:
   first and second substrates;
   a nematic liquid crystal layer sandwiched between said first and second substrates;
   a first alignment layer provided on said first substrate, said first alignment layer having molecules on a surface thereof buffed or otherwise aligned so as to define a first alignment direction;
   a second alignment layer which is not mechanically buffed, said second alignment layer disposed directly adjacent said first alignment layer, and molecular twisting in said second alignment layer enabling said second alignment layer to define a second alignment direction which is different than said first alignment direction, wherein molecules of said second alignment layer which contact said first alignment layer are oriented in said first alignment direction and molecules in said second alignment layer which contact the nematic liquid crystal layer are aligned in said second alignment direction; and
   said liquid crystal layer contacting each of said first alignment layer and said second alignment layer so that the pixel has two alignment domains or directions defined by said first and second alignment directions which are on said first substrate wherein liquid crystal molecules of said liquid crystal layer which contact said first alignment layer are oriented in said first alignment direction and liquid crystal molecules of said liquid crystal layer which contact said second alignment layer are oriented in said second alignment direction.

2. The pixel of claim 1, wherein said first alignment layer is mechanically buffed to define the first alignment direction;
   wherein said second alignment layer includes chiral dopant therein for causing molecular twist throughout thickness thereof, with the amount of molecular twist defining an angular difference between said first and second alignment directions; and
   wherein the first alignment layer has a first pre-tilt angle of from 2–5° and the second alignment layer has a pre-tilt angle of from about 5–20° so that the pre-tilt angles of the first and second alignment layers are different from one another in the pixel.

3. The pixel of claim 1, wherein said first and second alignment directions differ from one another by from about 160–200°, and wherein said second alignment layer defines a pre-tilt angle of from about 5–20° at a surface thereon adjacent said liquid crystal layer.

4. The pixel of claim 3, wherein said first and second alignment directions differ from one another by approximately 180°.

5. The pixel of claim 1, wherein said first alignment layer is mechanically rubbed and includes a polyimide and said second alignment layer is reactive and includes a reactive liquid crystalline including chiral dopant added thereto.

6. The pixel of claim 1, wherein said second alignment layer includes twist inducing dopant therein and said second alignment layer is photo-imageable so that ultraviolet radiation can be used to pattern material making up the second alignment layer.

7. The pixel of claim 1, wherein in said pixel the second alignment layer contacts approximately as many liquid crystal molecules of said nematic liquid crystal layer as does the first alignment layer, as in said pixel each of the first and second alignment layers have approximately the same amount of surface area exposed to said liquid crystal layer.

8. The pixel of claim 1, wherein said first alignment layer is mechanically buffed and is substantially continuous across the viewing zone of a display in which the pixel is provided.

9. The pixel of claim 8, wherein said second alignment layer is photo-curable and wherein said first alignment layer is mechanically buffed and orients and anchors molecules of said second alignment layer which contact said first alignment layer in said first alignment direction so that molecules of said second alignment layer are oriented in said first direction proximate said first alignment layer and molecules in said second alignment layer twist so as to be oriented in said second alignment direction proximate said liquid crystal layer.

10. The pixel of claim 1, wherein said second alignment layer includes reactive liquid crystalline with chiral dopant added thereto in an amount sufficient to cause molecules in said second alignment layer to twist throughout the thickness of the second alignment layer so as to define said second alignment direction.

11. The pixel of claim 10, wherein said second alignment layer is from about 75–99% by weight reactive photo-polymerizable liquid crystalline and from about 1–25% by weight chiral dopant.

12. The pixel of claim 11, wherein said second alignment layer is from about 88–93% by weight reactive liquid crystalline and from about 7–12% by weight chiral dopant.

13. The pixel of claim 1, further comprising a third alignment layer provided on said second substrate, wherein said third alignment layer defines a third alignment direction which is substantially perpendicular to each of said first and second alignment directions.

14. The pixel of claim 1, wherein twist-inducing dopant is present in said second alignment layer, and wherein the second alignment direction can be varied and controlled by the amount of said dopant present in the second alignment layer.

15. The pixel of claim 1, further comprising:
a third alignment layer which is continuous and mechanically buffed or photo-aligned and provided on said second substrate, with said third alignment layer defining a third alignment direction;
a fourth alignment layer which is not mechanically buffed provided on said third alignment layer, said fourth alignment layer defining a fourth alignment direction which is different than said first, second, and third alignment directions; and wherein nematic liquid crystal molecules of said liquid crystal layer which contact said third alignment layer are oriented in said third alignment direction and nematic liquid crystal molecules which contact said fourth alignment layer are oriented in said fourth alignment direction.

16. The pixel of claim 15, wherein said third alignment direction is substantially perpendicular to said first alignment direction, and said fourth alignment direction is substantially perpendicular to said first and second alignment directions.

17. The pixel of claim 16, wherein said second and fourth alignment layers have about as much surface area contacting said liquid crystal layer in said pixel as do said first and third alignment layers, respectively.

18. A display in which the pixel of claim 1 is provided, further comprising a first mechanically buffed retarder alignment layer and a corresponding tilted retarder formed directly adjacent part of said first retarder alignment layer so that molecules of said tilted retarder which contact said first retarder alignment layer are oriented and anchored in a first retarder alignment direction defined by said first retarder alignment layer.

19. The display of claim 18, further comprising a second retarder alignment layer which is not mechanically buffed, said second retarder alignment layer being disposed directly adjacent said first retarder alignment layer and said second retarder alignment layer defining a second retarder alignment direction which is different than said first retarder alignment direction, wherein each of said first and second retarder alignment layers contact one side of said tilted retarder and molecules of said retarder which contact said first retarder alignment layer are oriented in said first retarder alignment direction and molecules of said retarder which contact said second retarder alignment layer are oriented in said second retarder alignment direction so that optical retardation effects causes by said retarder are different for light passing through parts of the retarder adjacent said first retarder alignment layer than for light passing through parts of the retarder adjacent said second retarder alignment layer.

20. A liquid crystal display comprising:
a substrate;
a nematic liquid crystal layer;
a mechanically buffed alignment film defining a first alignment direction, said mechanically buffed alignment film supported by said substrate;
a reactive liquid crystalline alignment layer disposed on said mechanically buffed alignment film so that molecules of said reactive liquid crystalline alignment layer contacting said mechanically buffed alignment layer are oriented in substantially said first alignment direction and molecules of said reactive liquid crystalline alignment layer contacting said nematic liquid crystal layer are aligned in a second alignment direction which is substantially different than said first alignment direction, whereby said nematic liquid crystal layer contacts each of said mechanically buffed alignment film and said reactive liquid crystalline alignment layer.

21. A method of making a liquid crystal display, the method comprising the steps of:
providing a first substrate;
depositing a first alignment film on said first substrate;
mechanically buffing said first alignment film to define a first alignment direction;
depositing a reactive alignment layer on the substrate so as to be in direct contact with the mechanically buffed alignment film, the reactive alignment film defining a second alignment direction substantially different than the first alignment direction;

photo-imaging the reactive alignment film so as to expose certain areas of the underlying mechanically buffed alignment film; and providing a liquid crystal layer which contacts each of said mechanically buffed alignment film and said reactive alignment film so that the liquid crystal layer has at least two alignment directions or domains in a pixel of the display.

22. A liquid crystal display comprising:

a first substrate;

a first retarder alignment layer defining a first alignment direction supported by the first substrate;

a second retarder alignment layer defining a second alignment direction which is different that the first alignment direction, wherein said second retarder alignment layer is also supported by the first substrate and wherein the second retarder alignment layer is located directly adjacent the first retarder alignment layer so that molecules of said second retarder alignment layer which contact the first retarder alignment layer are oriented in approximately said first alignment direction;

the second retarder alignment layer being non-continuous so that portions of the underlying first retarder alignment layer are exposed; and a retarder layer disposed so that one side or surface thereof contacts each of said first and second retarder alignment layers, and molecules of said retarder layer which contact the first retarder alignment layer are oriented in approximately in said first alignment direction and molecules of said retarder layer which contact said second retarder alignment layer are oriented in approximately said second alignment direction so that the retarder has different optical effects upon light depending upon proximity of the first or second retarder alignment layer.

* * * * *